United States Patent [19]

Ruyle

[11] Patent Number: 4,971,526
[45] Date of Patent: Nov. 20, 1990

[54] DUAL AUGER TOP LOADING PUMPING SYSTEM FOR MANURE TANK WAGON

[76] Inventor: Phillip L. Ruyle, R.R. 1, Box 141A, Medora, Ill. 62063

[21] Appl. No.: 391,040

[22] Filed: Aug. 9, 1989

[51] Int. Cl.⁵ .............................................. F04B 3/00
[52] U.S. Cl. ................................. 417/244; 417/360; 417/900; 415/72
[58] Field of Search .................. 415/72; 417/900, 244, 417/360, 234

[56] References Cited

U.S. PATENT DOCUMENTS

| | | | |
|---|---|---|---|
| 734,687 | 7/1903 | Erter | 417/900 |
| 3,716,304 | 2/1973 | Coles | 417/900 |
| 3,876,341 | 4/1975 | Nesseth | 417/900 |
| 4,594,006 | 6/1986 | Depeault | 417/900 |
| 4,661,046 | 4/1987 | Ruyle | 417/203 |
| 4,813,849 | 3/1989 | Grujanac et al. | 415/72 |

FOREIGN PATENT DOCUMENTS 125961 5/1930 Fed. Rep. of Germany ...... 417/244

Primary Examiner—A. Michael Chambers
Attorney, Agent, or Firm—Fleit, Jacobson, Cohn, Price, Holman and Stern

[57] ABSTRACT

A pumping system for a top loading manure wagon utilizing dual augers interconnected by a hose with both augers being independently driven with one auger extending into a manure pit, lagoon or the like and the other auger extending to the top loading manure wagon. The augers include support structures, an inlet and an outlet and the auger extending to the top of the wagon is driven at a slightly higher speed than the auger extending into the pit in order to prevent plugging as well as to help create a vacuum therein. The auger which extends to the tank wagon includes a stand and a shoe at the lower end to keep the auger drive means from coming into contact with a supporting surface.

16 Claims, 2 Drawing Sheets

DUAL AUGER TOP LOADING PUMPING SYSTEM FOR MANURE TANK WAGON

BACKGROUND OF THE INVENTION

Field of the Invention

The present invention generally relates to a pumping system for a top loading manure wagon and more specifically to a pumping system utilizing dual augers which does not employ a vacuum-type wagon. The augers are interconnected by a hose with both augers being driven in a particular manner with a power assist auger extending into a manure pit, lagoon or the like and a power load stand auger extending to the top loading manure wagon with the augers including support structures to retain them in position and structure to protect the drive units for each of the augers. The power load stand auger includes an outlet spout at the top thereof to direct manure into the top of the wagon and operates at a slightly higher speed than the power assist auger in order to prevent plugging as well as to help create a vacuum in the power assist auger. The power load stand auger includes a support base and a stand with the base including a shoe at the lower end to keep the drive belt guard and pulleys from hitting the ground. The power load stand auger is provided with ejector paddles at the top thereof and is lined with a PVC liner. The power load stand is driven from the bottom end thereof by an appropriate electric motor or any other suitable means which stabilizes the unit and maintains it in proper orientation during use. The power assist auger includes an inlet end inserted into a pit or other reservoir and is driven from the upper end thereof and provided with any suitable support thereby providing a unit which will effectively pump manure into a tank wagon under non-vacuum conditions and which is relatively simple in construction and efficient in operation.

INFORMATION DISCLOSURE STATEMENT

My prior U.S. Pat. No. 4,661,046 issued Apr. 28, 1987 for Manure Vacuum Wagon Power Assist Auger discloses an auger that is used to pump manure from a pit, lagoon or the like through a screw auger and housing with a suction hose being connected to the upper end of the auger and to a vacuum manure wagon with the combined action of the auger and the applied vacuum being effective to remove manure from the pit or lagoon and deposit it in the vacuum manure wagon. A further development of the manure pumping system is disclosed in my Pat. No. 4,830,585 issued May 16, 1989 for Pumping System. In this patent, a power assist auger is provided between an auger inserted into a manure pit or the like and a pipe extending to the tank wagon with the vacuum assist auger pumping manure from the auger extending into the pit or lagoon into the pipe which discharges into a vacuum wagon.

The present invention uses a power assist auger which is speeded up and rather than utilizing a booster pump as in Pat. No. 4,830,585, the present invention utilizes a load stand auger connected with the power assist auger to pump the manure into the top of the wagon. The prior art does not disclose a dual auger of this invention for top loading manure into a wagon.

SUMMARY OF THE INVENTION

An object of the present invention is to provide a dual auger top loading pump system for a manure tank wagon in which the two augers are oriented in tandem relation with the discharge upper end of a power assist auger which extends into a manure pit being communicated with and connected with the inlet of a power load stand auger which discharges into a manure tank wagon by a flexible hose thereby providing a dual auger two-stage pumping system that does not rely upon a vacuum manure tank wagon.

A further object of the invention is to provide a pumping system in accordance with the preceding object in which the power load stand auger is operated at a higher speed than the speeded-up power assist auger thereby preventing plugging and increasing capacity with the increased speed of the power load stand auger also creating at least a partial vacuum in the speeded-up power assist auger thereby further enhancing the efficiency of operation of the pumping system.

Another object of the invention is to provide a pumping system in which the power load stand auger is provided with a self-supporting stand and a shoe which extends under the drive unit for the power load stand auger to protect the drive unit with the drive unit being located at the lower end of the power load stand auger to stabilize it and retain the outlet end thereof in proper orientation to the manure tank wagon for pumping manure from the pit or lagoon into the tank wagon.

Still another object of the invention is to provide a dual auger top loading pumping system for a non-vacuum type of manure tank wagon which is efficient in operation, effective in pumping a large volume of manure into a tank wagon without plugging thereby rendering the transportation of manure from a collection pit or reservoir to a disposal site more efficient and effective.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
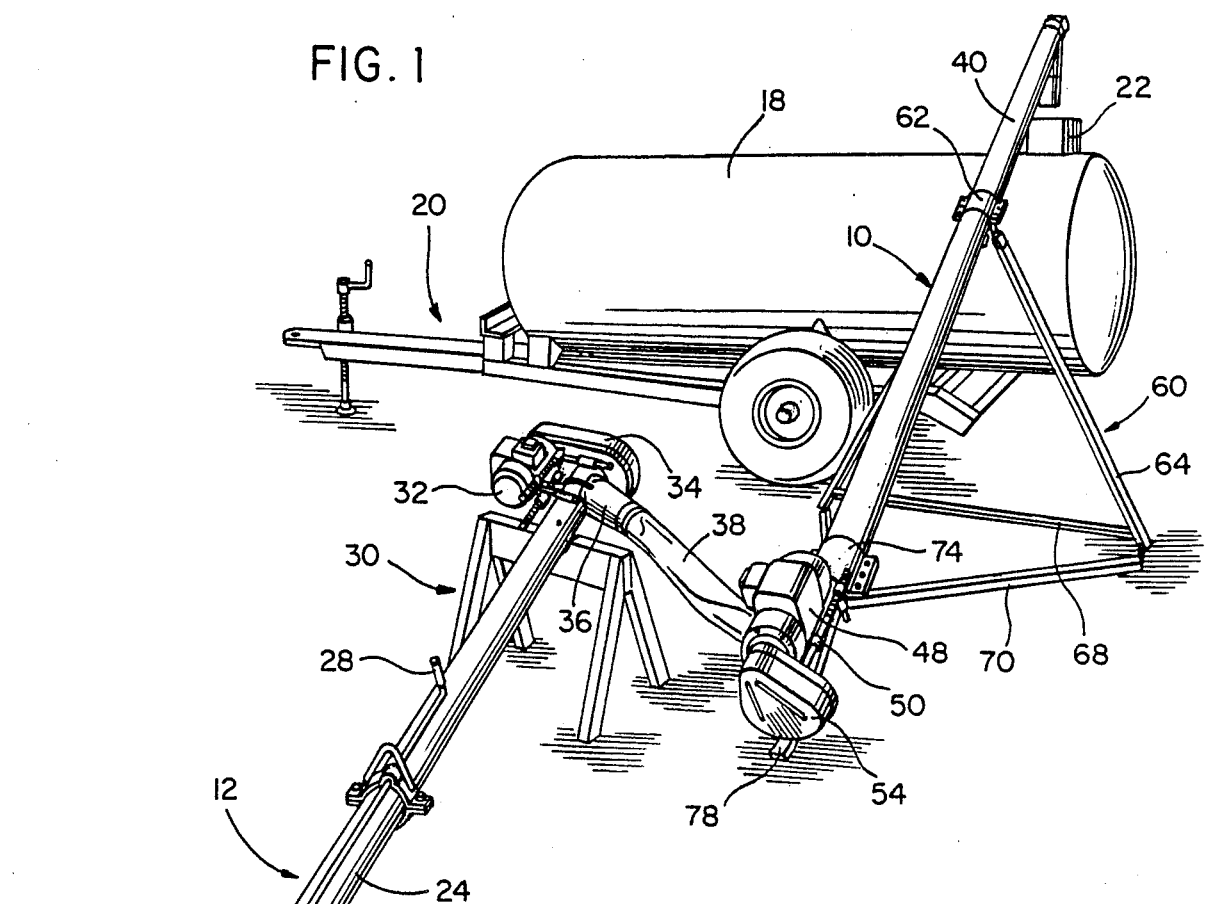
FIG. 1 is a perspective view of the dual auger top loading pumping system for manure tank wagons of the present invention.

Referring now specifically to the drawings, the pumping system of the present invention includes dual augers including a power load stand auger generally designated by reference numeral 10 and a speeded-up power assist auger generally designated by the numeral 12 for pumping liquified manure, various other liquids, slurries or the like as designated by reference numeral 14 from a collection pit, lagoon or reservoir 16 into a manure tank wagon 18 which may be in the form of a trailer mounted tank such as a two-wheeled trailer generally designated by the reference numeral 20 or it may be incorporated into any type of vehicular structure to enable the tank wagon 18 to move to desired collection and disposal sites. The tank wagon 18 includes an inlet opening 22 at the upper portion thereof for receiving manure from the pumping system of this invention.

The power assist auger 12 includes an elongated auger 24 having a movable inlet control member 26 at the lower end thereof and a control handle 28 for operating the control member in a manner similar to the structures disclosed in my previously mentioned Pat. No. 4,661,046. The auger 24 includes a cylindrical tube and an auger screw therein and is supported by a suitable stand of any type as generally designated by numeral 30 to orient the auger 24 in an upwardly inclined position with the inlet end submerged in the manure to be pumped. An electric motor or other suitable drive unit 32 is connected to the upper end of the auger screw for rotating it at a desired rotational speed with the motor connected to the end of the auger screw through a belt drive or the like provided with a belt guard 34. The upper end of the auger 24 is provided with a discharge or outlet fitting or pipe 36 extending laterally therefrom which is sealingly connected to a flexible hose 38 by the use of a suitable sealing material such as silicone or the like. The hose 38 is constructed of flexible, resilient material and is shape sustaining.

The power load stand auger 10 includes a cylindrical tube or housing 40 having an auger screw 42 therein with the inner surface 44 of the tube or housing 40 being lined with a PVC liner or the like. The lower end of the tube or housing 40 is provided with an inlet pipe 46 extending laterally therefrom with the hose 38 also being connected to the inlet pipe 46 with a suitable sealing material such as silicone used to provide a liquid tight connection. An electric motor 48 is mounted from the tube 40 by a bracket 50 with the motor driving the end of the auger screw 42 by a belt drive arrangement 52 protected by a belt guard 54. The upper end of the auger tube 40 is provided with a laterally extending discharge pipe 56 that is aligned with the inlet opening 22 on the tank wagon 18 as illustrated in FIG. 1 and the upper end of the auger screw is provided with paddles 58 thereon similar to the structure illustrated in my above-mentioned prior patents, particularly Pat. No. 4,661,046.

Figure 2:
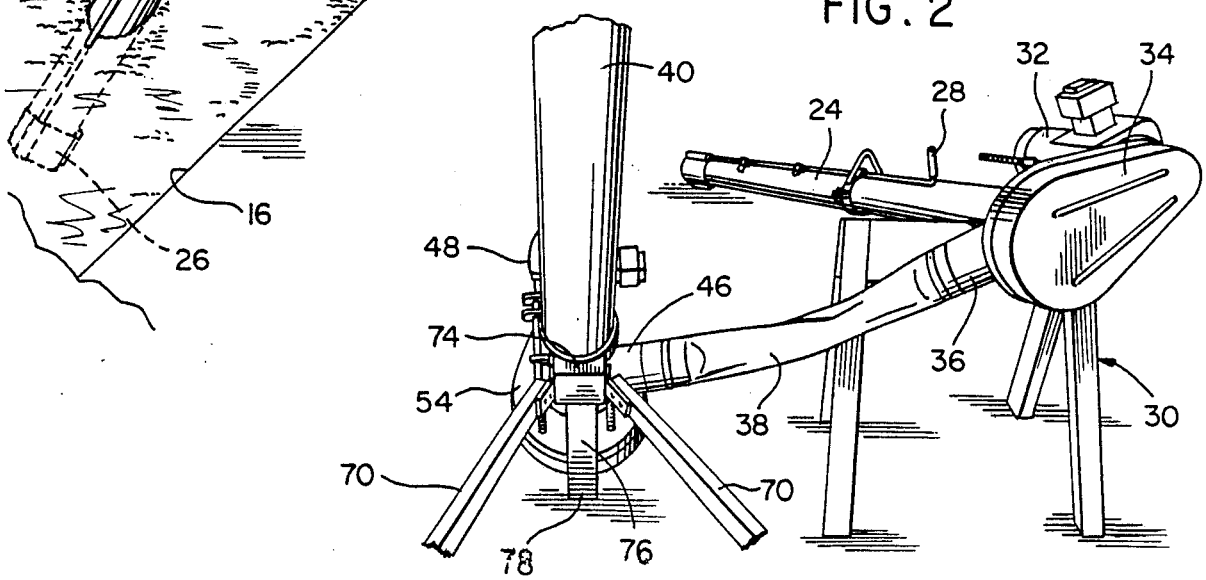
FIG. 2 is a fragmental, perspective view illustrating the association and interconnection between the speeded-up power assist auger which has an inlet positioned in the manure pit and the power load stand auger.
Figure 5:
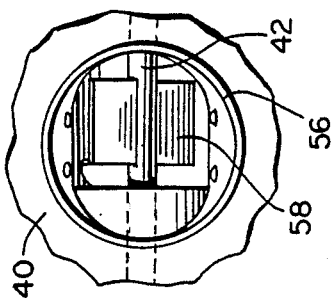
FIG. 5 is a detailed view of the outlet with ejecter paddles at the upper spout of the power load stand auger.
Figure 4:
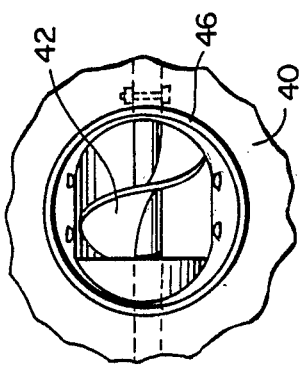
FIG. 4 is a detailed view illustrating the inlet of the power load stand auger.
Figure 3:
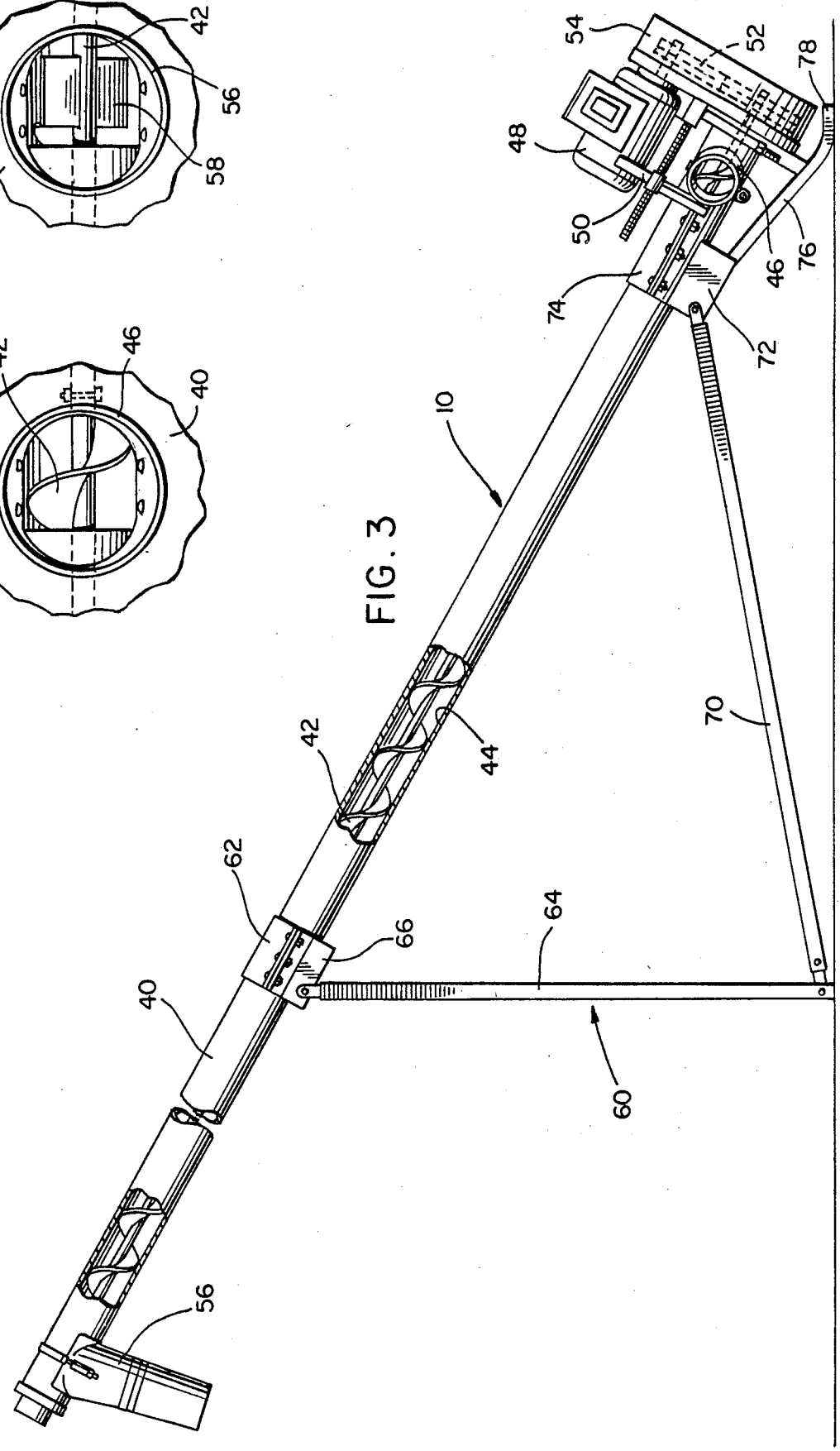
FIG. 3 is a side elevational view, with portions broken away, illustrating further structural details of the power load stand auger.

A support stand generally designated by the numeral 60 is provided for the power load stand auger 10 and includes a clamp-type bracket 62 mounted on the tube 40 and provided with a pair of downwardly and outwardly diverging support members 64 connected to flanges 66 on the bracket 62. The lower ends of the downwardly diverging support members which may be in the form of legs are interconnected by a bottom connecting member 68 to maintain the bottom ends of the support members 64 properly spaced apart. Pivotally attached to the lower end of each of the support members 64 is a brace 70 extending to and connected with flanges 72 on a clamp bracket 74 on the tube 40 adjacent the inlet pipe 46 as illustrated in FIGS. 2 and 3.

Also attached to the clamp bracket 74 is a protective support member 76 which extends longitudinally under the drive unit and terminates in a curved lower end or shoe 78 which engages a support surface and spaces the belt guard and related drive components from the supporting surface thereby protecting the drive unit from contact with the supporting surface.

By using the two augers 10 and 12, they can be set in different positions and angles to each other to permit loading of the tank wagon in locations where space is a limiting factor because the connection between the two augers is a flexible hose. Frequently, the assist auger 12 must be oriented with its inlet end extending through a relatively small access opening thereby limiting the positions in which the assist auger 12 can be oriented with the flexible hose thus enabling the power load stand auger 10 to be positioned in various relationships to the auger 12 in order for the discharge pipe 56 to be properly aligned with the opening in the tank wagon. Driving the power load stand auger 10 at a higher speed than the auger 12 and providing an airtight connection between the augers 10 and 12 enables a vacuum to be created in the auger 12 to assist in pulling manure from the pit 14. Thus, the essential features of this invention include the multi-position capabilities of the two augers which enhances its utility especially when encountering various loading situations. In some instances, a farm may have several manure pits and, in some instances, the access opening to the pit could be 8" in diameter thus limiting the position of the auger 12 and, in some instances, it may not be possible to place the tank wagon in optimum relation to the auger 12 thus requiring that the auger 10 be oriented in various angular positions within the limits of the flexible and shape sustaining connecting hose 38 which maintains an airtight relationship for creating a vacuum assist in the auger 12 while yet enabling the auger 10 to be positioned in various relationships to the auger 12.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A dual auger pumping system for loading a pumpable medium from a storage area into a mobile tank wagon having an inlet above the storage area, said pumping system comprising an auger in the form of an elongated tubular housing with an auger screw rotatable therein and including an inlet end extending into the storage area, means driving the other end of the auger screw with the tubular housing having an outlet adjacent the end thereof from which the auger screw is driven, a load stand auger in the form of a tubular housing and auger screw therein having a discharge pipe aligned with an inlet of the tank wagon, means driving the auger screw at the other end of the housing, said load stand auger housing including an inlet adjacent the driving means for the auger screw and a flexible hose interconnecting the discharge of the auger having its inlet in the storage area and the inlet of the auger having its discharge pipe aligned with the inlet in the tank wagon to maintain airtight integrity between the augers and enabling the auger having its discharge pipe aligned with the inlet of the tank wagon to be adjustably oriented in relation to the auger having its inlet in the storage area.

2. The structure as defined in claim 1 wherein said storage area is a manure pit having an access opening receiving the inlet end of the auger extending into the storage area, said load stand auger being independently driven to convey a volume of pumpable manure larger than the volume conveyed by the auger extending into the storage area thereby creating a vacuum condition in the auger extending into the storage area to assist in conveying manure from the pit into the tank wagon.

3. The structure as defined in claim 2 wherein said flexible hose is shape sustaining and sealed to the outlet of the auger extending into the pit and the inlet of the auger having its discharge pipe aligned with the inlet in the tank wagon to enable vacuum conditions created by the load stand auger to be induced on the auger extending into the manure pit.

4. The structure as defined in claim 3 wherein the outlet of the auger extending into the manure pit is located at a higher elevation than the inlet of the load stand auger to provide gravity assist to the pumpable material as it is discharged from the auger extending into the manure pit to the load stand auger.

5. The structure as defined in claim 4 wherein said means driving each of said auger screws includes a motor mounted on the tubular housing and drivingly connected to an auger screw by a belt and pulley drive to enable variation in the driving characteristics of the auger screws.

6. The structure as defined in claim 5 wherein the auger screw in the load stand auger includes radial paddles at the end thereof in alignment with the discharge pipe to facilitate discharge of manure into the tank wagon.

7. The structure as defined in claim 1 wherein said load stand auger includes a supporting stand attached thereto to support the tubular housing in upwardly inclined relation.

8. The structure as defined in claim 7 wherein said supporting stand includes a clamp attached to the tubular housing, a pair of depending, diverging legs connected to the clamp, the lower ends of said legs being interconnected to maintain them in spaced relation, a pair of braces connected to the lower ends of the legs and extending in converging relation toward the tubular housing adjacent the drive means, and a clamp bracket mounted on the tubular housing and connected to the braces to form a rigid stand for the load stand auger.

9. The structure as defined in claim 8 wherein said clamp bracket includes a depending support member extending axially of the tubular housing and terminating in a curved shoe underlying the drive means for the auger screw to protect the drive means from contact with supporting surfaces.

10. The structure as defined in claim 9 together with means supporting the outlet end of the auger extending into the storage area in desired angular position.

11. The structure as defined in claim 10 wherein said storage area is a manure pit having an access opening receiving the inlet end of the auger extending into the storage area, said load stand auger being independently driven to convey a volume of pumpable manure larger than the volume conveyed by the auger extending into the storage area thereby creating a vacuum condition in the auger extending into the storage area to assist in conveying manure from the pit into the tank wagon, said flexible hose being shape sustaining and sealed to the outlet of the auger extending into the pit and the inlet of the auger having its discharge pipe aligned with the inlet in the tank wagon to enable vacuum conditions created by the load stand auger to be induced on the auger extending into the manure pit.

12. The structure as defined in claim 11 wherein the outlet of the auger extending into the manure pit is located at a higher elevation than the inlet of the load stand auger to provide gravity assist to the pumpable material as it is discharged from the auger extending into the manure pit to the load stand auger, said means driving each of said auger screws including a motor mounted on the tubular housing and drivingly connected to an auger screw by a belt and pulley drive to enable variation in the driving characteristics of the auger screws.

13. A pumping system for a manure slurry positioned in a pit having an access opening for pumping the manure slurry into a mobile tank for transport to a desired site, said pumping system comprising an auger extending into the pit and including an inlet end submerged in the manure slurry, said auger having an outlet at the opposite end thereof, an upwardly inclined loading auger having an outlet end communicated with the mobile tank and a lower end having an inlet, each of said augers including an auger screw with means independently drivingly connected to each of said auger screws, and means flexibly communicating and interconnecting the augers to provide a flow path between the manure pit and the mobile wagon.

14. The structure as defined in claim 13 wherein said means communicating and interconnecting the augers includes a flexible, shape sustaining hose to convey manure slurry and maintain a fluid tight communication between the augers.

15. The structure as defined in claim 14 wherein said loading auger includes drive means operated at a higher speed than the drive means on the auger having the inlet end submerged in the manure slurry to form a vacuum condition in the auger having the inlet end submerged in the manure slurry to assist in conveying manure slurry into the mobile tank.

16. The structure as defined in claim 14 wherein the inlet end of the loading auger is positioned at an elevation lower than the outlet of the auger extending into the manure pit to utilize gravity assist in flow of manure slurry between the augers.

* * * * *